(12) United States Patent
Kennedy

(10) Patent No.: US 6,832,728 B2
(45) Date of Patent: Dec. 21, 2004

(54) REMOTE INDICIA READING SYSTEM

(75) Inventor: James M. Kennedy, Palm Desert, CA (US)

(73) Assignee: PIPS Technology, Inc., Knoxville, TN (US)

(*) Notice: Subject to any disclaimer, the term of this patent is extended or adjusted under 35 U.S.C. 154(b) by 138 days.

(21) Appl. No.: 09/817,572

(22) Filed: Mar. 26, 2001

(65) Prior Publication Data

US 2002/0134835 A1 Sep. 26, 2002

(51) Int. Cl.$^7$ .................................................. G06K 7/10
(52) U.S. Cl. ............. 235/468; 235/462.01; 235/462.14; 235/462.22
(58) Field of Search ........................ 235/462.01, 462.06, 235/462.34, 468, 462.14, 462.11; 340/942

(56) References Cited

U.S. PATENT DOCUMENTS

| | | | | |
|---|---|---|---|---|
| 4,268,179 A | * | 5/1981 | Long et al. | 235/432 |
| 4,368,979 A | * | 1/1983 | Ruell | 250/271 |
| 4,491,923 A | | 1/1985 | Look | |
| 4,605,846 A | * | 8/1986 | Duret et al. | 235/468 |
| 4,908,500 A | | 3/1990 | Baumberger | |
| 4,958,064 A | * | 9/1990 | Kirkpatrick | 235/384 |
| 4,970,389 A | * | 11/1990 | Danforth et al. | 156/240 |
| 5,237,164 A | | 8/1993 | Takada | |
| 5,436,437 A | * | 7/1995 | Ho | 235/384 |
| 5,521,815 A | * | 5/1996 | Rose, Jr. | 705/28 |
| 5,585,616 A | * | 12/1996 | Roxby et al. | 235/454 |
| 5,682,030 A | * | 10/1997 | Kubon | 235/462.25 |
| 5,734,343 A | * | 3/1998 | Urbish et al. | 340/556 |
| 5,760,384 A | * | 6/1998 | Itoh et al. | 235/468 |
| 5,915,032 A | * | 6/1999 | Look | 382/100 |
| 6,142,372 A | * | 11/2000 | Wright | 235/375 |
| 6,213,393 B1 | * | 4/2001 | Streicher et al. | 141/94 |
| 6,448,889 B1 | * | 9/2002 | Hudson | 340/425.5 |

FOREIGN PATENT DOCUMENTS

| | | |
|---|---|---|
| DE | 200 15 840 U | 3/2001 |
| EP | 0 416 742 A2 | 3/1991 |
| GB | 2248994 A | 4/1992 |
| GB | 2 280 027 A | 1/1995 |
| WO | WO 92/03808 | 3/1992 |
| WO | WO 99/36836 | 7/1999 |

OTHER PUBLICATIONS

European Search Report in EPO Application No. EP 02 25 1672 dated Jul. 15, 2002.
Annex to European Search Report in EPO Application No. EP 02 25 1672, dated Jul. 15, 2002.

* cited by examiner

Primary Examiner—Michael G. Lee
Assistant Examiner—Ahshik Kim
(74) Attorney, Agent, or Firm—Luedeka, Neely & Graham, P.C.

(57) ABSTRACT

An apparatus is provided for reading indicia, such as a bar code, from a remote location. The apparatus includes a light source for illuminating the indicia, preferably with infrared illumination. The indicia is incorporated in a reflective medium, disposed remotely from the light source, which reflects the illumination provided by the light source. The apparatus includes a light sensing device also disposed remotely from the reflective medium. The light sensing device receives the reflected image of the indicia and generates an indicia image signal based thereon. An indicia processing system receives and operates on the indicia image signal to extract indicia information therefrom. The light source and the light sensing device may be located up to 75 feet or more away from the reflective medium, and the reflective medium may be moving at speeds of up to 85 miles per hour or more relative to the light source and the light sensing device. To prevent blurring of the reflected indicia image, the infrared illumination is preferably provided in pulses, and the light sensing device is shuttered in synchronism with the pulses. The indicia and reflective medium may be attached to a motor vehicle, a trailer portion of a tractor/trailer rig, a railroad box car or container, or any other type of vehicle, package, or cargo container.

18 Claims, 2 Drawing Sheets

REMOTE INDICIA READING SYSTEM

TECHNICAL FIELD

The present invention is generally directed to a system for reading indicia on a vehicle, container, or package. More particularly, the invention is directed to a system for reading bar codes on moving vehicles, containers, or packages from a remote location.

BACKGROUND OF THE INVENTION

Motorists who daily use a pay-for-park parking garage often pay for use of the garage on a monthly or yearly basis. To gain access to the garage, these motorists are typically issued a key card which they insert into a card reader to open a gate. Typically, using such a key card requires the motorist to stop the vehicle, roll down a window or open a door, and insert and retract the card. Such systems present unnecessary impediments to the motorist's access to the garage.

Motorists who often use a toll road may also pay for use of the road on a monthly or yearly basis, or on a pay-per-use basis. In some known systems, radio-frequency transponders are issued to the motorist which transmit a signal to a receiving device alongside an on-ramp or off-ramp. These signals from the transponder identify the motorist, and provide for billing the motorist for the use of the toll road, or for opening a gate to give the motorist access to the toll road. Typically, these transponders require mounting on or in the vehicle, and they must be powered by their own batteries or by the vehicle's battery. Such transponders add significant cost to the toll road access and billing system, a cost which is typically passed on to the motorist in the form of higher tolls.

What is needed, therefore, is an inexpensive, easy to implement, easy to use, and low-maintenance means for identifying moving vehicles and other types of moving containers or packages, such as vehicles entering parking garages or toll roads, or containers moving along a conveyor belt.

SUMMARY OF THE INVENTION

The foregoing and other needs are met by an apparatus for reading indicia, such as a bar code, from a remote location. The apparatus includes a light source for illuminating the indicia, preferably with infrared illumination. The indicia is included in a reflective medium, disposed remotely from the light source, which reflects the illumination provided by the light source. The portions of the illumination reflected from the indicia comprise a reflected indicia image. The apparatus includes a light sensing device which is also disposed remotely from the reflective medium. The light sensing device receives the reflected indicia image and generates an indicia image signal based thereon. An indicia processing system receives and operates on the indicia image signal to extract indicia information therefrom. The indicia and reflective medium may be attached to a motor vehicle, a trailer portion of a tractor/trailer rig, a railroad box car or container, or any other type of vehicle, package, or cargo container.

In preferred embodiments of the invention, the light source and the light sensing device may be located up to 75 feet or more away from the reflective medium, and the reflective medium may be moving at speeds of up to 85 miles per hour or more relative to the light source and the light sensing device. To prevent blurring of the reflected indicia image, the infrared illumination is preferably provided in pulses, and the light sensing device is shuttered in synchronism with the pulses.

Thus, the invention provides a means for reading a bar code, or other such indicia, on a vehicle or container moving at a high rate of speed. Since the light sensing device need not be immediately adjacent the bar code in order to read it, the invention may be used to read the bar code from the side of or from above a highway, railroad track, or conveyor belt as the vehicle, railroad car, or container speeds by.

BRIEF DESCRIPTION OF THE DRAWINGS

Further advantages of the invention will become apparent by reference to the detailed description of preferred embodiments when considered in conjunction with the drawings, which are not to scale, wherein like reference characters designate like or similar elements throughout the several drawings as follows.

DETAILED DESCRIPTION OF THE PREFERRED EMBODIMENT

Figure 1:
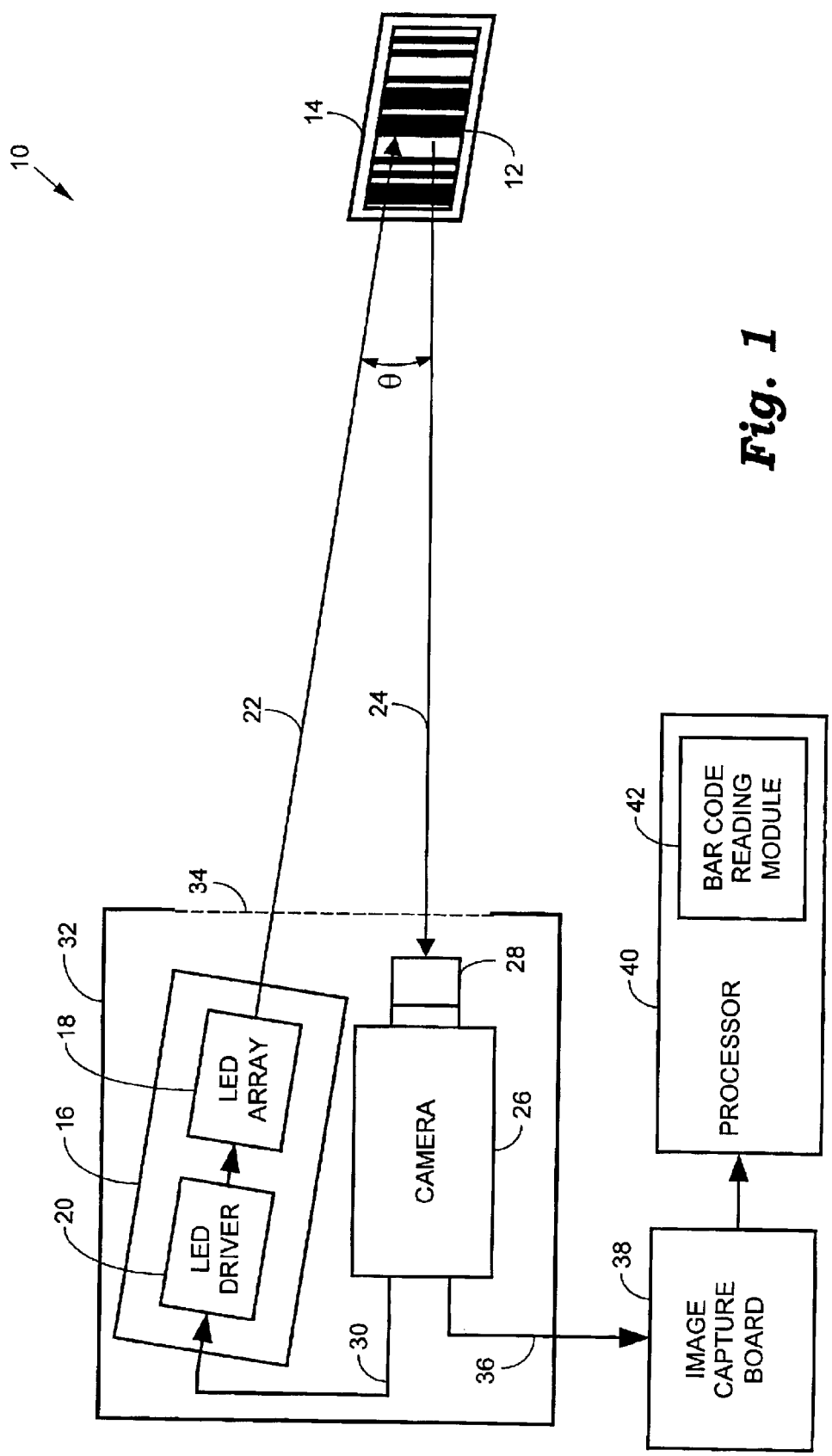
FIG. 1 is a functional block diagram of a system for remotely reading indicia according to a preferred embodiment of the invention.

The bar code has long been the preferred means for encoding identifying information, such as on product packaging for purposes of inventory control. A major hurdle for adapting bar code technology to applications other than inventory control has been the necessity for the bar code to be quite close to the bar code reading device (typically a laser) as the bar code is read. Depicted in FIG. 1 is a preferred embodiment of a system 10 for remotely reading a bar code 12, or any other type of indicia, from as far away as about 75 feet or more as the bar code 12 is moving at speeds of up to about 85 miles-per-hour or more relative to the rest of the system 10. Thus, the system 10 provides means for remotely reading bar codes and other indicia attached to motor vehicles moving at highway speeds.

Preferably, the bar code 12 is provided on a reflective medium 14, such as a retro-reflective tape manufactured by the 3M corporation. The term "retro-reflective" is used herein to refer to reflective media which provide high levels of reflectance along a direction back toward the source of illuminating radiation. Although in the preferred embodiment of the invention, the reflective medium 14 is retro-reflective tape, it should be appreciated that other types of reflective surfaces could be used. Thus, the invention is not limited in scope to any particular type of reflector on which the bar code 12 is provided.

The bar code 12 is illuminated by a light source 16, which preferably includes an array 18 of light emitting diodes (LED's) driven by an LED driver circuit 20. In the preferred embodiment, the array 18 includes 40 to 400 LED's, where the exact number is determined by the brightness of illumination required for a particular application. In the preferred embodiment, the LED's used in the array 18 are manufactured by Siemens under part number SFH4503. The LED's preferably have a continuous current rating of about 100 mA, but may be driven with pulses having ten times the continuous rating.

Preferably, the LED's emit infrared radiation having a wavelength in the range of about 770 to 1100 nanometers, with a center wavelength of approximately 940 nm or 880 nm. A center wavelength of greater than about 800 nm is preferred so that the illumination is not visible to the human eye. A center wavelength of about 940 nm is most preferred, because at that wavelength, sunlight is partially absorbed by water vapor in the atmosphere. Thus, at about 940 nm, background interference due to sunlight has less detrimental effect on the operation of the system. One skilled in the art will appreciate that the actual operational wavelength may be selected based upon the particular application of the system, and that the invention is not limited by operation at any particular wavelength.

The LED driver circuit 20 provides the LED array 18 with high-energy pulses having current amplitudes of preferably about 1000 mA. In the preferred embodiment, the driver circuit 20 provides pulses having pulse widths of about one millisecond at a pulse rate of about 50–60 pulses per second. The exact pulse rate is generally determined by the standard frequency of the source power in the country of use. For example, in the United Kingdom, the pulse rate may be 50 HZ, while in the United States, the pulse rate may be 60 HZ.

The pulsed light energy from the LED array 18 is directed along an illumination path 22 to the reflective medium 14.

With continued reference to FIG. 1, the system 10 further includes a light sensing device, such as a camera 26. In the preferred embodiment, the camera 26 is a video camera, such as the model number P356 manufactured by Pearpoint, Inc., which incorporates a charge-coupled-device (CCD) sensor that is sensitive to infrared radiation at wavelengths up to 1100 nm. The camera 26 is mechanically or electronically shuttered, but is most preferably electronically shuttered. In the preferred embodiment, when the shutter is activated (opened), the camera 26 sends a trigger pulse to the light source 16 over the line 30 to activate the light source 16 to generate a light pulse simultaneously with the opening of the shutter. Preferably, the width of the light pulse is substantially the same as the shutter open time. Coincident with the trigger pulse, the electronic shutter activates the CCD sensor of the camera 26 to receive light reflected from the reflective medium 14 and to generate an indicia image signal based thereon. The shutter activates the CCD sensor to receive light for a period of about 0.1 to 1.0 mS, and most preferably for about 1.0 mS. Longer shutter times could be used if there is less relative motion between the reflective medium 14 and the camera 26. Thus, the shutter "open" period corresponds to the pulse width of the illuminating pulse from the light source 16, and the timing of the shutter "open" period is in synchronism with the timing of the illuminating pulse.

As shown in FIG. 1, the preferred embodiment of the invention includes an infrared band pass filter 28 having a pass band substantially centered on the peak output wavelength of the LED array 18. The bandwidth of the filter 28 is sufficient to pass most of the energy of the reflected infrared pulse, while rejecting light of other wavelengths, such as from sunlight and vehicle headlamps.

As depicted in FIG. 1, the beam of infrared energy from the light source 16 is reflected from the reflective medium 14 to form a reflected image of the bar code 12. The bar code image includes dark portions where little or no infrared energy is reflected toward the camera 26, and light portions where the infrared energy is reflected back toward the camera 26 from the retro-reflective material. This reflected image propagates toward the camera 26 along a reflected image path 24 which forms an angle θ with the illumination path 22. In the preferred embodiment of the invention, this angle θ is no greater than about two degrees. Since the retro-reflective material of the reflective medium 14 reflects most of the radiation from the light source 16 back toward the light source 16, it is desirable to keep the angle θ as small as possible. Thus, the camera 26 is preferably positioned as closely as possible to the light source 16.

In the preferred embodiment, the light source 16 and camera 26 are housed within a common protective housing 32 to protect them from inclement weather. The housing 32 preferably includes an infrared transparent window 34 through which the light source 16 transmits infrared illumination toward the reflective medium 14 and through which the camera 26 receives the reflected image. In an alternative embodiment of the invention, the window 34 also serves as an infrared band pass filter having properties similar to those of the filter 28 described above. In this embodiment, the separate band pass filter 28 attached to the camera 26 is not necessary.

The use of pulsed infrared illumination enhances the operation of the system 10 in several ways. When illuminated with infrared radiation, a bar code constructed from retro-reflective materials provides a crisp, high-contrast reflected image, regardless of the time of day or amount of ambient illumination. Further, because the infrared illumination can be pulsed at such a high level, and the retro-reflective material returns such a high percentage of incident infrared light back toward the camera 26, a very fast shutter speed can be employed. This fast shutter speed virtually eliminates blurring of the reflected bar code image as the bar code 12 moves in relation to the camera 26. Even at highway speeds of up to 85 mph, the bar code image received by the CCD sensor of the camera 26 is of sufficient quality to recognize each distinct feature in the bar code 12.

One skilled in the art will appreciate that by proper selection of the illumination power of the light source 16, the width of the illumination pulses, and the shutter open time, the system 10 may be made to operate at distances of much larger than 75 feet and at relative speeds of much greater than 85 mph. The distances and speeds described herein for a preferred embodiment are merely examples which are consistent with the application of the system 10 in reading bar codes 12 on vehicles moving at typical highway speeds. Thus, it should be appreciated that the invention is not limited to any particular relative speed or separation distance between the camera 26 and the bar code 12.

As depicted in FIG. 1, the indicia image signal is provided from the camera 26 to an image acquisition board 38 through an interface cable 36. The image acquisition board 38, such as model number PCI-1411 manufactured by National Instruments Corporation of Austin, Tex., or model number DT3153 manufactured by Data Translation, Inc. of Marlboro, Mass., captures and formats the indicia image signal to be processed by a digital processor 40. The processor 40, such as a Pentium III processor manufactured by Intel, preferably processes the indicia image signal as a bit-mapped image, although other image formats may be used, such as JPEG or GIF.

The processor 40 extracts the bar code information from the indicia image signal based on processing instructions provided by a bar code reading software module 42. In the preferred embodiment, the module 42 operates on the bit-mapped image captured by the image acquisition board 38 to determine whether a bar code 12 is present in the image, and if so, to detect the individual bars in the image that comprise the bar code 12. Preferably, the module 42 detects the bar code 12 within the indicia image by analyzing the image for a combination of spatial and spectral features representative of a bar code. The orientation of the barcode 12 is preferably determined by similar means, and the bar code image is then processed orthogonal to the bars to determine the coding. Since the bar code image is two-dimensional, it may be processed along many such lines orthogonal to the bars of the bar code 12.

Figure 2:
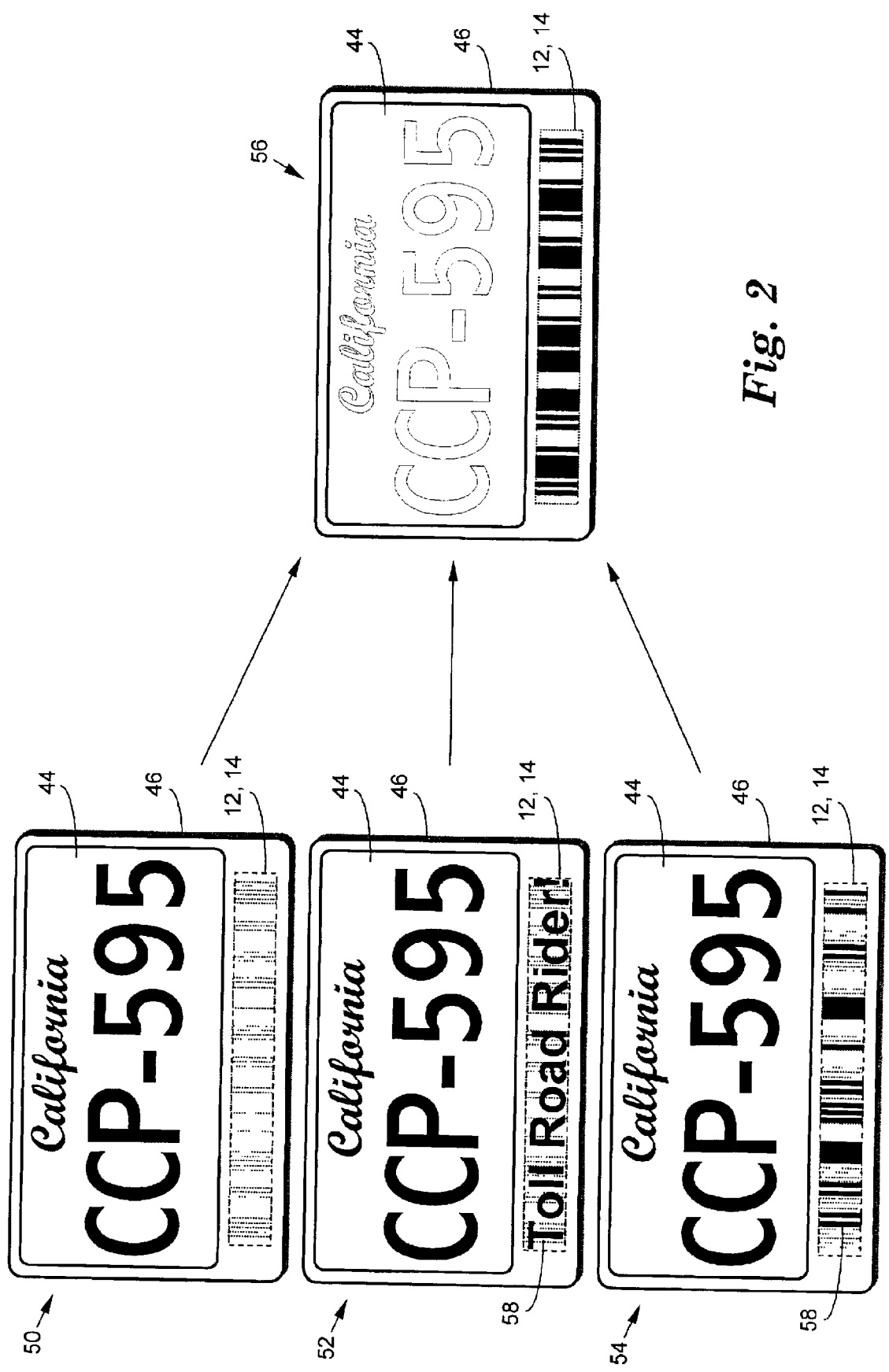
FIG. 2 depicts hidden bar codes applied to license plate frames according to several preferred embodiments of the invention.

FIG. 2 depicts three different visible light images 50, 52, 54 of three embodiments of a vehicle license plate 44 surrounded by a license plate cover or frame 46 that includes a covert bar code 12. Attached to the lower portions of each of the frames 46 is the reflective medium 14 containing the bar code 12. In image 50, the frame 46 is constructed of a material, such as Perspex Black 962 manufactured by ICI Acrylics Ltd., which transmits infrared light, but which is opaque to visible light. The reflective medium 14 depicted in image 50 is attached to the back side of the frame 46, such that the reflective medium 14 (shown in dashed outline) is not detected when the frame 46 is viewed from the front side in visible light. However, as depicted in the infrared image 56, the reflective medium 14 and the bar code 12 are detected when the front side of the frame 46 is illuminated by infrared light from the light source 16 and viewed by the camera 26. In this embodiment, the infrared illumination passes through the frame 46, is reflected from the reflective medium 14, passes again through the frame 46, and is detected by the camera 26. Since the frame 46 does not pass visible light, the bar code 12 is not seen under visible light. This covertness thwarts those who might otherwise counterfeit a visible bar code for use on a vehicle to gain unauthorized access to a parking facility or for use on a toll road.

In another embodiment, as depicted in the visible-light image 52 of FIG. 2, the reflective medium 14 and bar code 12 are applied to the front side of the frame 46 and are concealed by other graphic components 58, such as a phrase consisting of alphanumeric characters. The graphic components 58 which conceal the bar code 12 are transparent to infrared light, so that the reflected infrared image detected by the camera 26 appears as depicted in the image 56 of FIG. 2. In this embodiment, since the illumination need not pass through the frame 46, it may be constructed from materials that are not transmissive to infrared radiation, such as metal.

In a further embodiment, as depicted in the visible-light image 54 of FIG. 2, the reflective medium 14 and bar code 12 are on the front side of the frame 46 and are again concealed by other graphic components 58. In this embodiment, the concealing graphic components 58, which are transparent to infrared light, comprise a "decoy" bar code. This embodiment is used to thwart bar code counterfeiters who will mistake the visible decoy bar code for the actual bar code 12. Again, the reflected infrared image detected by the camera 26 appears as depicted in the image 56 of FIG. 2.

It will be appreciated that the reflective medium 14 and bar code 12 of the embodiments depicted in images 52 and 54 could be incorporated as part of the license plate 44 rather than as part of a separate license plate cover or frame 46. It will also be appreciated that a concealed reflective medium 14 and bar code 12 could be embedded in an infrared-transparent body panel of a vehicle or in the sun screen material which is typically applied to the upper portions of vehicle windshields or rear window panels. Thus, the scope of the invention is not limited to any particular method for applying the bar code 12 or any particular location on the vehicle or container.

It is contemplated, and will be apparent to those skilled in the art from the preceding description and the accompanying drawings that modifications and/or changes may be made in the embodiments of the invention. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. An apparatus for reading indicia from a remote location, comprising:
    an infrared light source for providing infrared illumination;
    a reflective medium disposed remotely from the infrared light source, the reflective medium including indicia operable to reflect the infrared illumination provided by the infrared light source, where portions of the infrared illumination reflected from the indicia comprise a reflected indicia image;
    a light sensing device disposed remotely from the reflective medium, the light sensing device for receiving the reflected indicia image and for generating an indicia image signal based thereon;
    an indicia processing system for receiving the indicia image signal and for operating on the indicia image signal to extract indicia information there from; and
    a cover disposed over the indicia on the reflective medium and between the reflective medium and the light sensing device, the cover being transmissive to the infrared illumination and the reflected indicia image and non-transmissive to visible light, such that the indicia on the reflective medium beneath the cover are substantially undetectable to human eyesight, wherein the cover is separable and removable from the reflective medium.

2. The apparatus of claim 1 wherein the light sensing device further comprises a camera incorporating charge-coupled devices.

3. The apparatus of claim 1 wherein the reflective medium is disposed at least 5 feet away from the light source and the light sensing device.

4. The apparatus of claim 1 further comprising a protective housing in which the light source and the light sensing device are disposed.

5. The apparatus of claim 1 wherein the light source provides the illumination along an illumination path, the light sensing device receives the reflected indicia image along a reflected image path, and wherein an included angle between the illumination path and the reflected image path is no greater than about two degrees.

6. The apparatus of claim 1 further comprising:
    the light sensing device for generating the indicia image signal as a bit-mapped image of the indicia; and
    the indicia processing system for receiving the bit-mapped image and for operating on the bit-mapped image to extract the indicia information therefrom.

7. The apparatus of claim 1 wherein the indicia further comprise a bar-code.

8. The apparatus of claim 1 wherein the reflective medium further comprises a retro-reflective material.

9. The apparatus of claim 1 wherein the light sensing device is operable to receive the reflected indicia image and generate the indicia image signal, and the indicia processing system is operable to operate on the indicia image signal to extract the indicia information as the reflective medium is moving relative to the light source and the light sensing device.

10. The apparatus of claim 9 wherein the reflective medium is operable to be disposed on a motor vehicle, a railroad car, or a cargo container.

11. An apparatus for reading indicia from a remote location, comprising:
- an infrared light source for providing infrared illumination;
- a reflective medium disposed remotely from the infrared light source, the reflective medium including indicia operable to reflect the infrared illumination provided by the infrared light source, where portions of the infrared illumination reflected from the indicia comprise a reflected indicia image;
- a light sensing device disposed remotely from the reflective medium, the light sensing device for receiving the reflected indicia image and for generating an indicia image signal based thereon;
- an indicia processing system for receiving the indicia image signal and for operating on the indicia image signal to extract indicia information there from; and
- graphic components disposed over the indicia on the reflective medium and between the reflective medium and the light sensing device, the graphic components being transmissive to the infrared illumination and the reflected indicia image and non-transmissive to visible light, such that the indicia on the reflective medium beneath the graphic components are substantially undetectable to human eyesight, wherein the graphic components are separable and removable from the reflective medium.

12. The apparatus of claim 11 wherein the graphic components comprise alphanumeric characters.

13. The apparatus of claim 11 wherein the graphic components comprise a decoy bar code.

14. An apparatus for reading a bar code from a remote location, comprising:
- a light source for providing infrared illumination from a fixed location;
- a retro-reflective medium operable to be disposed on a vehicle or container which is remote from the light source and which is moveable relative to the light source, the retro-reflective medium including the bar code which is operable to reflect the infrared illumination provided by the light source, where portions of the infrared illumination reflected from the bar code comprise a reflected bar code image;
- a light sensing device disposed at the fixed location remote from the retro-reflective medium for receiving the entire reflected bar code image simultaneously and for generating a bar code image signal based thereon;
- a bar code processing system for receiving the bar code image signal and for operating on the bar code image signal to extract bar code information there from as the retro-reflective medium is moving relative to the light source and the light sensing device; and
- a cover disposed over the bar code and between the retro-reflective medium and the light sensing device, the cover being transmissive to the infrared illumination and the reflected bar code image and non-transmissive to visible light, such that the bar code on the retro-reflective medium beneath the cover is substantially undetectable to human eyesight, wherein the cover is separable and removable from the retro-reflective medium.

15. An apparatus for reading indicia from a remote location, comprising:
- an infrared light source for providing infrared illumination;
- a frame configured to surround and be separable from a vehicle license plate, the frame having at least a portion formed from material that is transmissive to infrared illumination and non-transmissive to visible light;
- a reflective medium attached to the portion of the frame, the reflective medium including indicia operable to reflect the infrared illumination provided by the infrared light source, where portions of the infrared illumination reflected from the indicia comprise a reflected indicia image;
- a light sensing device disposed remotely from the reflective medium, the light sensing device for receiving the reflected indicia image and for generating an indicia image signal based thereon; and
- an indicia processing system for receiving the indicia image signal and for operating on the indicia image signal to extract indicia information there from.

16. An apparatus for reading indicia from a remote location, comprising:
- an infrared light source for providing infrared illumination;
- a frame configured to surround and be separable from a vehicle license plate;
- a reflective medium attached to the frame, the reflective medium including indicia operable to reflect the infrared illumination provided by the infrared light source, where portions of the infrared illumination reflected from the indicia comprise a reflected indicia image;
- graphic components formed of a material that is transmissive to the infrared illumination and the reflected indicia image, and non-transmissive to visible light, the graphic components attached to the frame and concealing the indicia from human eyesight;
- a light sensing device disposed remotely from the reflective medium, the light sensing device for receiving the reflected indicia image and for generating an indicia image signal based thereon; and
- an indicia processing system for receiving the indicia image signal and for operating on the indicia image signal to extract indicia information there from.

17. The apparatus of claim 16, wherein the indicia comprises an actual bar code and the graphic components comprise a decoy bar code.

18. A frame configured to surround and be separable from a vehicle license plate, the frame comprising:
- a reflective medium attached to the frame, the reflective medium including indicia operable to reflect infrared illumination provided by an infrared light source, where portions of the infrared illumination reflected from the indicia comprise a reflected indicia image; and
- graphic components formed of a material that is transmissive to the infrared illumination and the reflected indicia image, and non-transmissive to visible light, the graphic components concealing the indicia from human eyesight.

* * * * *